United States Patent
Togashi et al.

(10) Patent No.: US 8,526,162 B2
(45) Date of Patent: Sep. 3, 2013

(54) FEEDTHROUGH MULTILAYER CAPACITOR

(75) Inventors: Masaaki Togashi, Tokyo (JP); Takashi Aoki, Tokyo (JP); Hiroshi Okuyama, Tokyo (JP); Yutaro Kotani, Tokyo (JP)

(73) Assignee: TDK Corporation, Tokyo (JP)

( * ) Notice: Subject to any disclaimer, the term of this patent is extended or adjusted under 35 U.S.C. 154(b) by 54 days.

(21) Appl. No.: 13/415,431

(22) Filed: Mar. 8, 2012

(65) Prior Publication Data
US 2012/0250218 A1 Oct. 4, 2012

(30) Foreign Application Priority Data
Apr. 4, 2011 (JP) ................................. 2011-082877

(51) Int. Cl.
*H01G 4/35* (2006.01)
*H01G 4/005* (2006.01)

(52) U.S. Cl.
USPC ......................................... 361/302; 361/303

(58) Field of Classification Search
USPC ........................................ 361/302–303, 311
See application file for complete search history.

(56) References Cited

U.S. PATENT DOCUMENTS

| 6,768,630 B2 * | 7/2004 | Togashi | 361/306.1 |
| 2009/0015982 A1 * | 1/2009 | Togashi | 361/302 |
| 2009/0034153 A1 * | 2/2009 | Togashi | 361/302 |

FOREIGN PATENT DOCUMENTS

| JP | 06151244 A * | 5/1994 |
| JP | A-07-254528 | 10/1995 |
| JP | 2002237429 A * | 8/2002 |

* cited by examiner

*Primary Examiner* — Eric Thomas
(74) *Attorney, Agent, or Firm* — Oliff & Berridge, PLC

(57) ABSTRACT

A conducting portion includes a plurality of conducting inner electrodes. Each of a pair of capacitance portions includes a plurality of signal inner electrodes while adjacently opposing each other in the laminating direction, a plurality of first grounding inner electrodes while adjacently opposing each other in the laminating direction, and a plurality of second grounding inner electrodes while adjacently opposing each other in the laminating direction. The plurality of first grounding inner electrodes are located between the conducting portion and the plurality of signal inner electrodes, while one of the first grounding inner electrodes adjacently opposes one of the first signal inner electrodes in the laminating direction. The plurality of second grounding inner electrodes are located between principal faces opposing each other in the laminating direction in the outer surface and the plurality of signal inner electrodes.

10 Claims, 17 Drawing Sheets

Fig.6
(a)
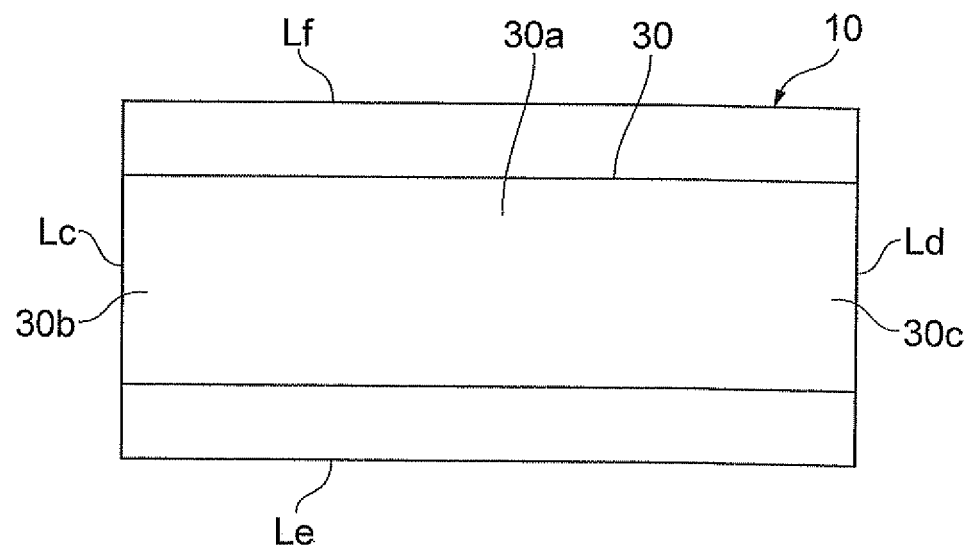
(b)
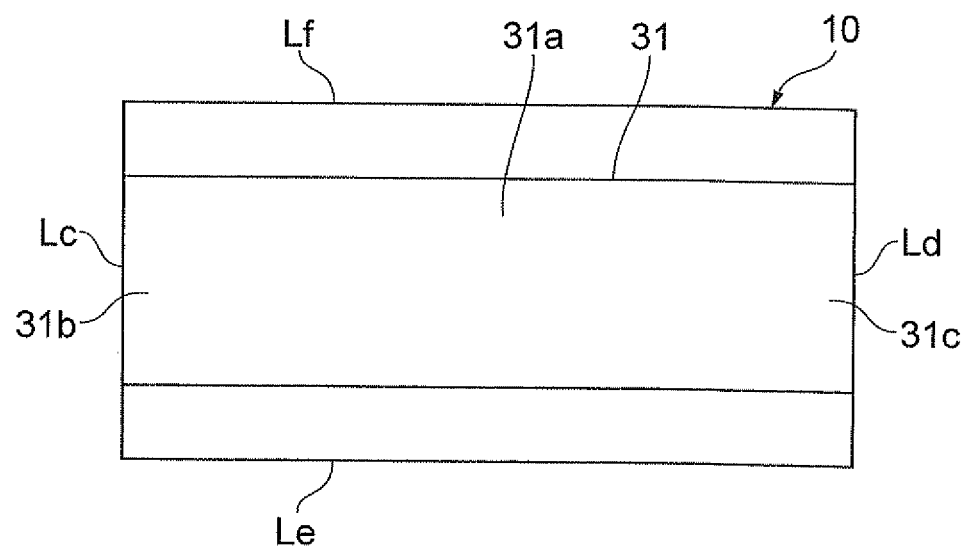

Fig.7
(a)
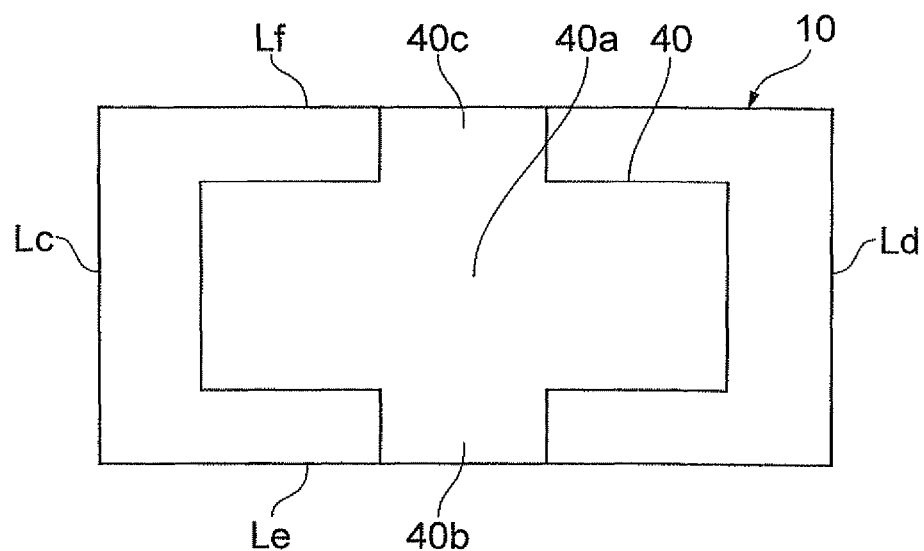
(b)
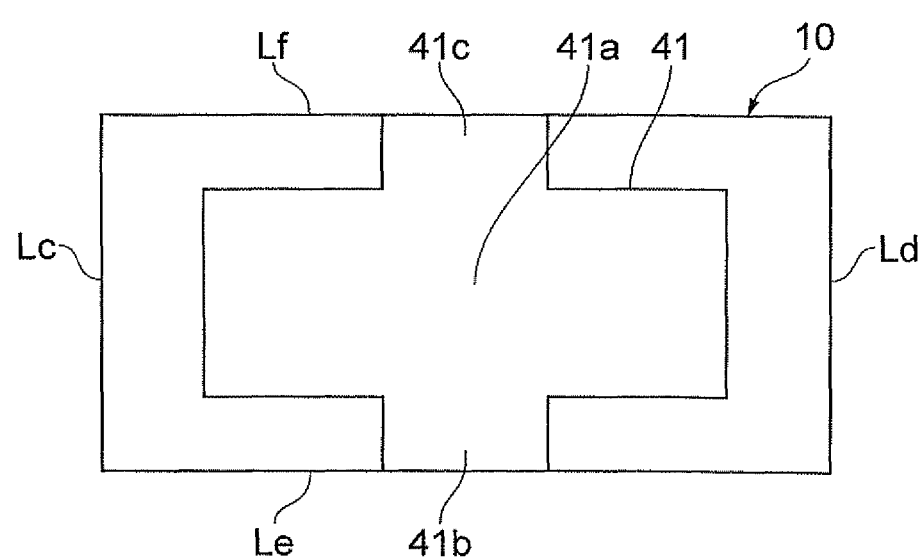

Fig.13
(a)
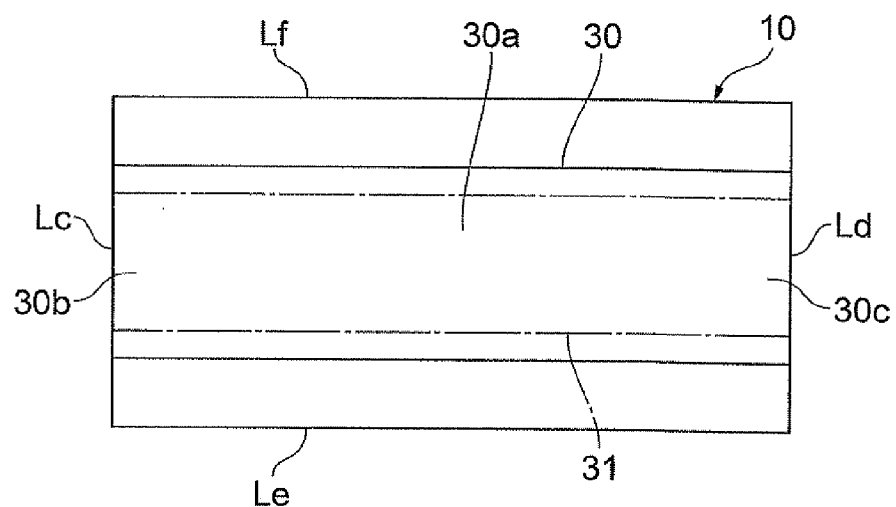
(b)
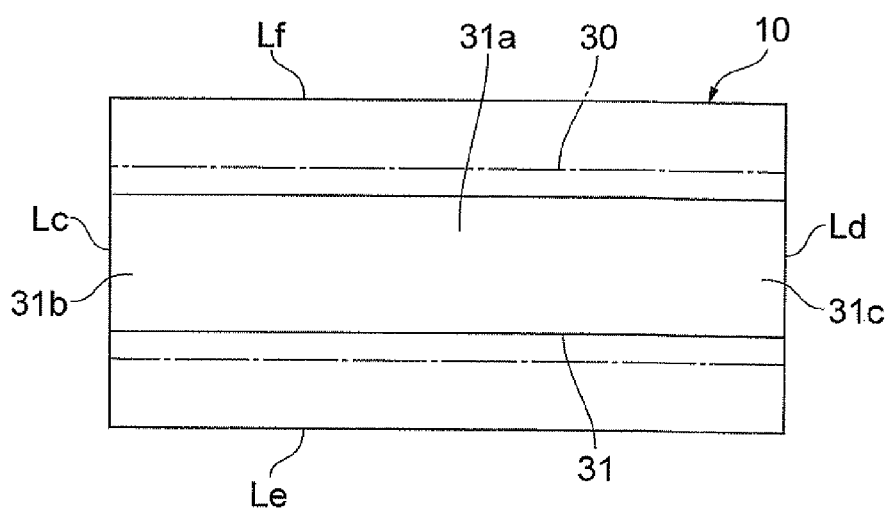

Fig.14
(a)
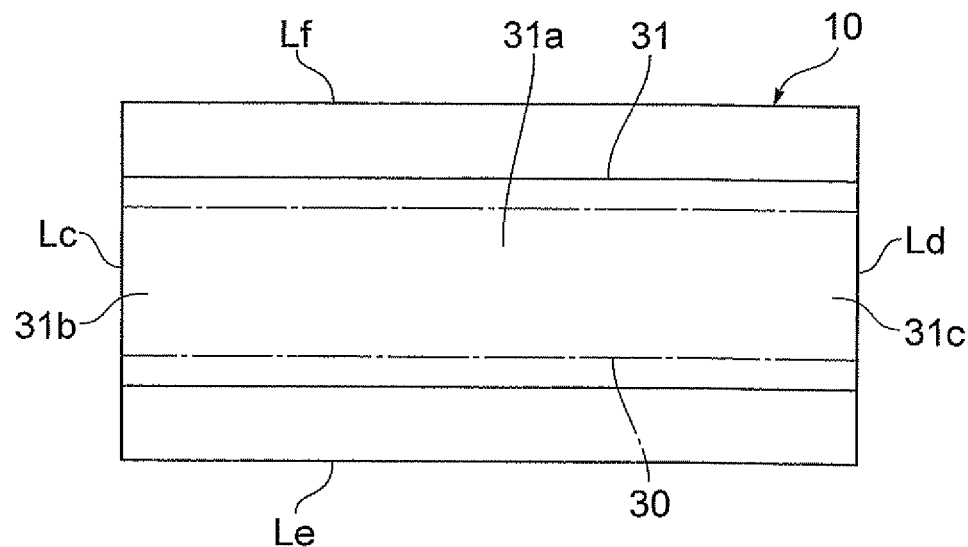
(b)
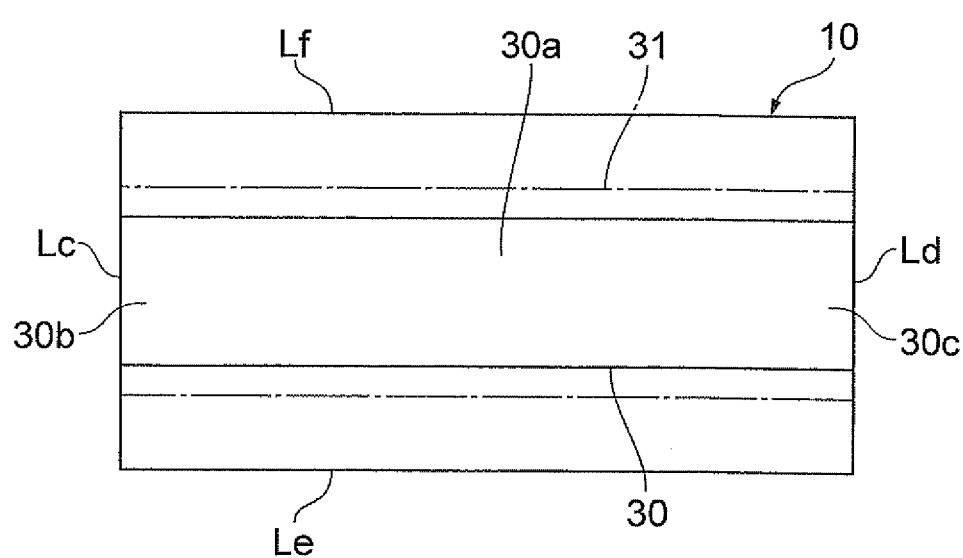

Fig.15
(a)
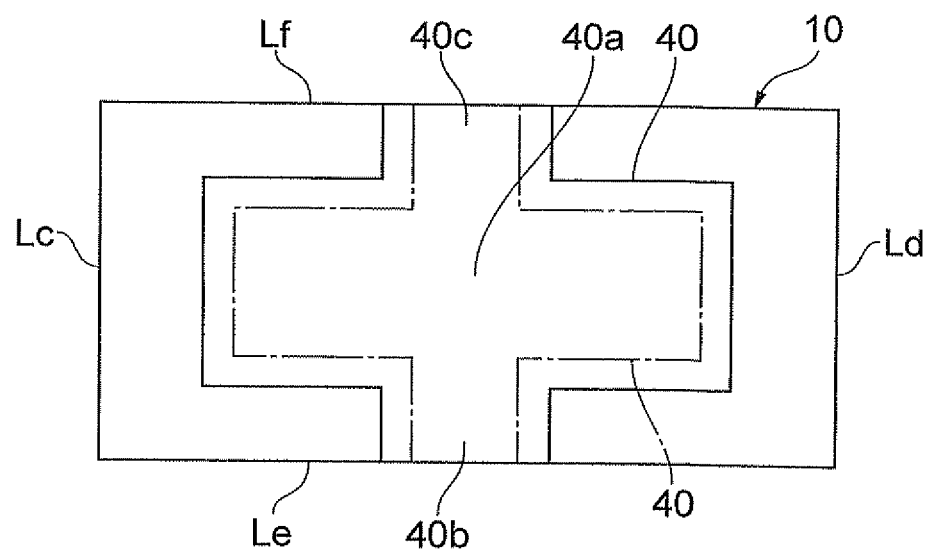
(b)
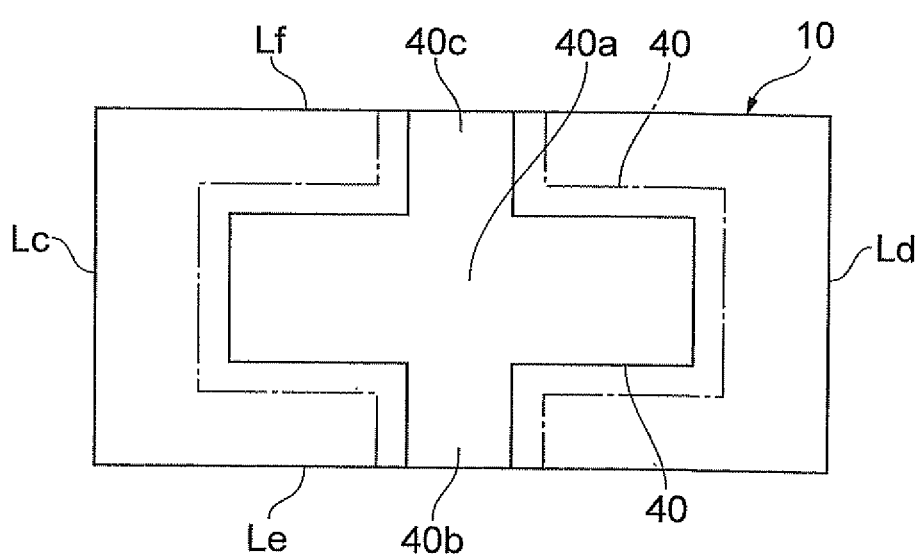

Fig.16
(a)
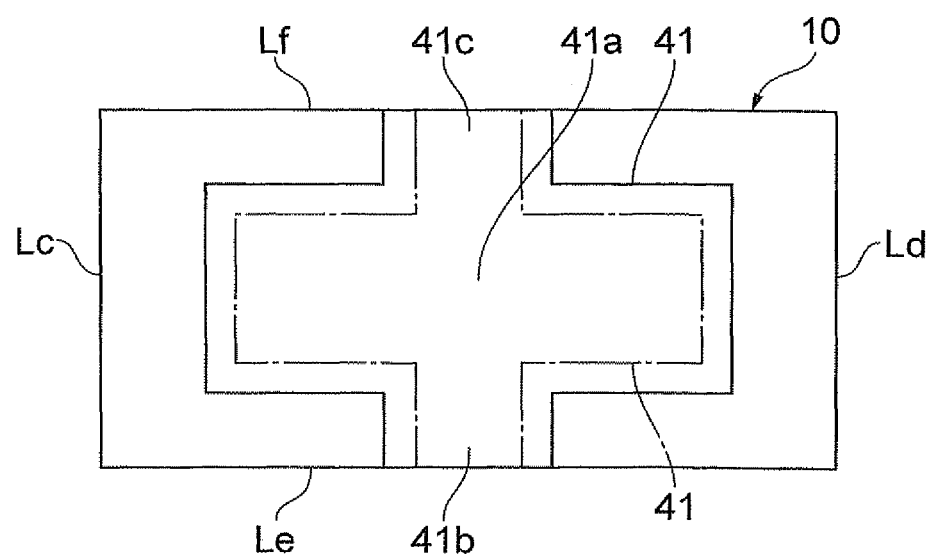
(b)
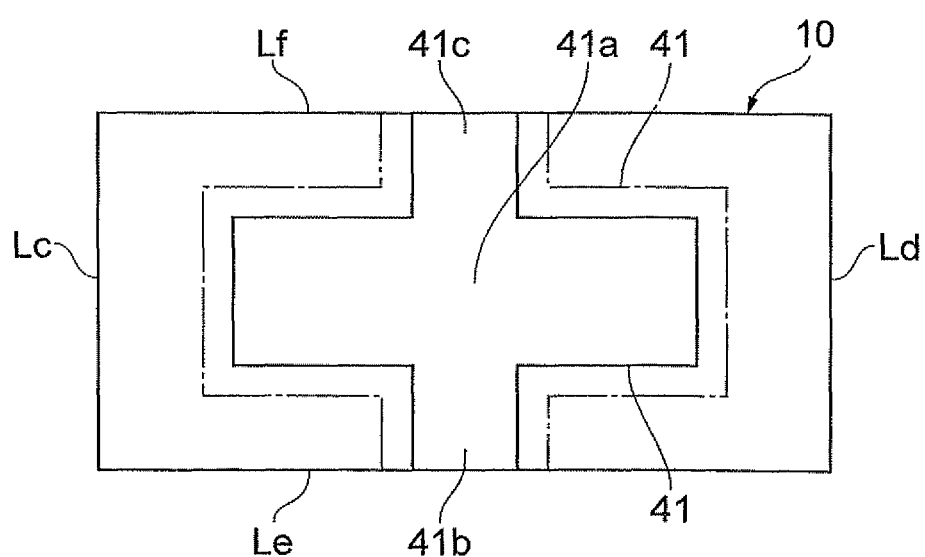

FEEDTHROUGH MULTILAYER CAPACITOR

BACKGROUND OF THE INVENTION

1. Field of the Invention

The present invention relates to a feedthrough multilayer capacitor.

2. Related Background Art

Known as a feedthrough multilayer capacitor is one comprising a capacitor body in which a plurality of dielectric layers and a plurality of inner electrodes are laminated, and first and second signal terminal electrodes and a grounding terminal electrode which are disposed on the outer surface of the capacitor body, while the inner electrodes include a plurality of signal inner electrodes connected to the first and second signal terminal electrodes and a plurality of grounding inner electrodes connected to the grounding terminal electrode (see, for example, Japanese Patent Application Laid-Open No. 7-254528). Since a plurality of signal inner electrodes are arranged between the grounding inner electrodes in the feedthrough multilayer capacitor disclosed in Japanese Patent Application Laid-Open No. 7-254528, the DC resistance is low in the signal inner electrodes in total, whereby a tolerable level of DC electricity is secured in the feedthrough multilayer capacitor.

SUMMARY OF THE INVENTION

However, it is still difficult for the feedthrough multilayer capacitor disclosed in Japanese Patent Application Laid-Open No. 7-254528 to fully secure the tolerable level of DC electricity.

It is an object of the present invention to provide a feedthrough multilayer capacitor which has sufficiently low DC resistance and can fully enhance the tolerable level of DC electricity.

The feedthrough multilayer capacitor in accordance with the present invention comprises a capacitor body in which a plurality of insulator layers and a plurality of inner electrodes are laminated, and first and second signal terminal electrodes and a grounding terminal electrode each disposed on an outer surface of the capacitor body; wherein the capacitor body has a conducting portion and a pair of capacitance portions holding the conducting portion therebetween in a laminating direction in the capacitor body; wherein the conducting portion includes a plurality of conducting inner electrodes connected to the first and second signal terminal electrodes as the inner electrodes; wherein each of the pair of capacitance portions includes a plurality of signal inner electrodes connected to the first and second signal terminal electrodes while adjacently opposing each other in the laminating direction, a plurality of first grounding inner electrodes connected to the grounding terminal electrode while adjacently opposing each other in the laminating direction, and a plurality of second grounding inner electrodes connected to the grounding terminal electrode while adjacently opposing each other in the laminating direction as the inner electrodes; wherein the plurality of first grounding inner electrodes are located between the conducting portion and the plurality of signal inner electrodes, one of the first grounding inner electrodes adjacently opposing one of the signal inner electrodes in the laminating direction; and wherein the plurality of second grounding inner electrodes are located between principal faces opposing each other in the laminating direction in the outer surface and the plurality of signal inner electrodes, one of the second grounding inner electrodes adjacently opposing one of the signal inner electrodes in the laminating direction.

Since the conducting portion located between a pair of capacitance portions includes a plurality of conducting inner electrodes connected to the first and second signal terminal electrodes, the feedthrough multilayer capacitor of the present invention has sufficiently low DC resistance. Therefore, it can fully enhance the tolerable level of DC electricity.

In the conducting portion, the first and second signal terminal electrodes are electrically connected to each other through the conducting inner electrodes. Therefore, high-frequency noise components arriving at the conducting portion, if any, are transmitted without being removed. When the feedthrough multilayer capacitor is mounted to an electronic device (e.g., a circuit board, an electronic component, or the like) while using one of the principal faces opposing each other in the laminating direction as a mount surface, one of the capacitance portions is located closer to the electronic device than is the conducting portion in the present invention. As a consequence, the high-frequency noise components fed to the feedthrough multilayer capacitor from the electronic device side are removed by the capacitance portion located on the mount surface side before reaching the conducting portion.

There are a plurality of first grounding inner electrodes in the feedthrough multilayer capacitor of the present invention. This lowers equivalent series resistance (ESR) and thus can reduce losses in high-frequency signals. There are a plurality of second grounding inner electrodes in addition to the first grounding inner electrodes, thus yielding a number of junctions between the grounding inner electrodes and the grounding terminal electrode. This can improve the adhesion between the capacitor body and the grounding terminal electrode.

When a large DC electricity flows through the feedthrough multilayer capacitor, the conducting inner electrodes and signal inner electrodes are heated. Since there are a plurality of second grounding inner electrodes located closer to the principal faces opposing each other in the laminating direction, the feedthrough multilayer capacitor of the present invention can efficiently dissipate the heat generated therewithin.

The plurality of signal inner electrodes may be constituted by only the first signal inner electrode adjacently opposing the one first grounding inner electrode in the laminating direction and the second signal inner electrode adjacently opposing the one second grounding inner electrode in the laminating direction. In this case, the signal inner electrodes have a two-layer structure constituted by only the first and second signal inner electrodes. When the signal inner electrodes have three or more layers, there is a signal inner electrode which is not adjacent to any of the grounding inner electrodes. This may cause high-frequency noise components to flow into the signal inner electrode not adjacent to any of the grounding inner electrodes, thereby worsening the effect of removing noises. When the signal inner electrodes are constituted by only the first and second signal inner electrodes, there is no risk of worsening the noise removal effect.

The plurality of first grounding inner electrodes may have a gap therebetween narrower than that between the one first grounding inner electrode and the one signal inner electrode adjacently opposing each other in the laminating direction. The plurality of second grounding inner electrodes may have a gap therebetween narrower than that between the one second grounding inner electrode and the one signal inner electrode adjacently opposing each other in the laminating direction. Each of these cases makes the gap between the grounding inner electrodes relatively narrow, whereby the heat generated therewithin can be dissipated more efficiently.

The gap between the inner electrode in the capacitance portion located closest to the conducting portion and the conducting inner electrode located closest to the capacitance portion may be wider than that between the inner electrodes in the capacitance portion. This enhances the impedance between the capacitance portion and the conducting portion, so that high-frequency noise components are hard to reach the conducting portion. Therefore, the noise removal effect can be improved.

One of the conducting inner electrodes and one of the first grounding inner electrodes may adjacently oppose each other in the laminating direction, the gap between the one conducting inner electrode and the one first grounding inner electrode being wider than each of gaps between the signal inner electrodes, the first grounding inner electrodes, and the second grounding inner electrodes in the pair of capacitance portions. This can improve the noise removal effect as mentioned above.

Each of the pair of capacitance portions may further comprise signal inner electrodes located between the conducting portion and the plurality of first grounding inner electrodes while adjacently opposing one of the conducting inner electrodes in the laminating direction, the gap between the signal inner electrode adjacently opposing the one conducting inner electrode in the laminating direction and the one conducting inner electrode being wider than each of gaps between the signal inner electrodes, the first grounding inner electrodes, and the second grounding inner electrodes in the pair of capacitance portions. This more strongly inhibits high-frequency noise components from flowing through the conducting inner electrodes and thus can further improve the noise removal effect.

The feedthrough multilayer capacitor may be constructed such that the plurality of signal inner electrodes include two signal inner electrodes having respective areas different from each other, the plurality of first grounding inner electrodes include two first grounding inner electrodes having respective areas different from each other, the plurality of second grounding inner electrodes include two second grounding inner electrodes having respective areas different from each other, an outer contour of a portion of the signal inner electrode having the larger area placed within the capacitor body is located on the outside of an outer contour of a portion of the signal inner electrode having the smaller area placed within the capacitor body as seen in the laminating direction, an outer contour of a portion of the first grounding inner electrode having the larger area placed within the capacitor body is located on the outside of an outer contour of a portion of the first grounding inner electrode having the smaller area placed within the capacitor body as seen in the laminating direction, an outer contour of a portion of the second grounding inner electrode having the larger area placed within the capacitor body is located on the outside of an outer contour of a portion of the second grounding inner electrode having the smaller area placed within the capacitor body as seen in the laminating direction, the signal inner electrode having the larger area and the first or second grounding inner electrode having the smaller area adjacently oppose each other in the laminating direction, and the signal inner electrode having the smaller area and the first or second grounding inner electrode having the larger area adjacently oppose each other in the laminating direction. This suppresses respective fluctuations in areas by which the pairs of signal inner electrodes, the first grounding inner electrodes, and the second grounding inner electrodes overlap each other in the laminating direction. Therefore, fluctuations in capacitance caused by those in inner electrode positions in the capacitance portions can be reduced.

The plurality of second grounding inner electrodes may include three or more layers of the second grounding inner electrodes. This can more efficiently dissipate the heat generated within the feedthrough multilayer capacitor.

The number of the plurality of conducting inner electrodes may be greater than the total number of the plurality of signal inner electrodes, plurality of first grounding inner electrodes, and plurality of second grounding inner electrodes. This can further lower the DC resistance, thereby more fully enhancing the tolerable level of DC electricity.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 6 is a set of plan views showing first and second signal inner electrodes;

FIG. 7 is a set of plan views showing first and second grounding inner electrodes;

FIG. 13 is a set of plan views showing a modification example of the first and second signal inner electrodes;

FIG. 14 is a set of plan views showing the modification example of the first and second signal inner electrodes;

FIG. 15 is a set of plan views showing a modification example of the first grounding inner electrodes;

FIG. 16 is a set of plan views showing a modification example of the second grounding inner electrodes.

DESCRIPTION OF THE PREFERRED EMBODIMENTS

The preferred embodiments of the present invention will be described below in detail with reference to the accompanying drawings. In the description, the same elements or elements with the same functionality will be denoted by the same reference signs, without redundant description.

Figure 1:
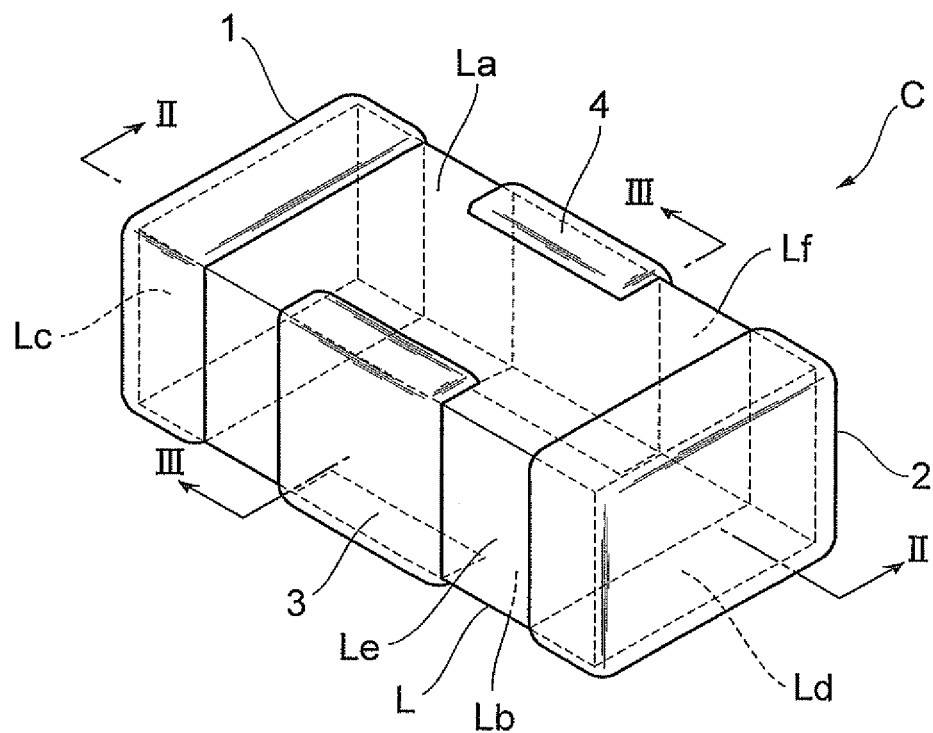
FIG. 1 is a perspective view showing the feed-through multilayer capacitor in accordance with an embodiment.
Figure 2:
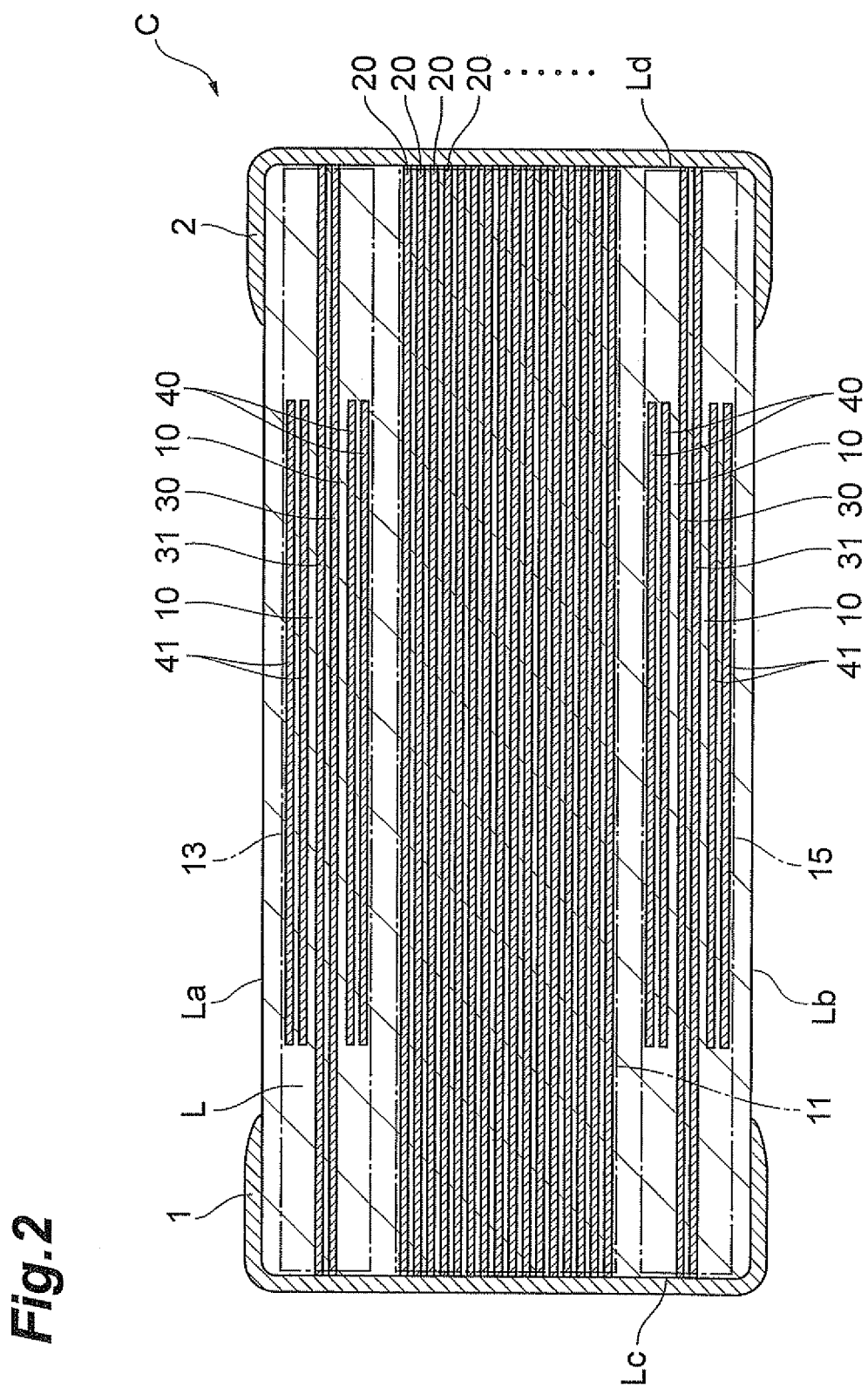
FIG. 2 is a drawing for explaining a cross-sectional structure taken along the line II-II in FIG. 1.
Figure 3:
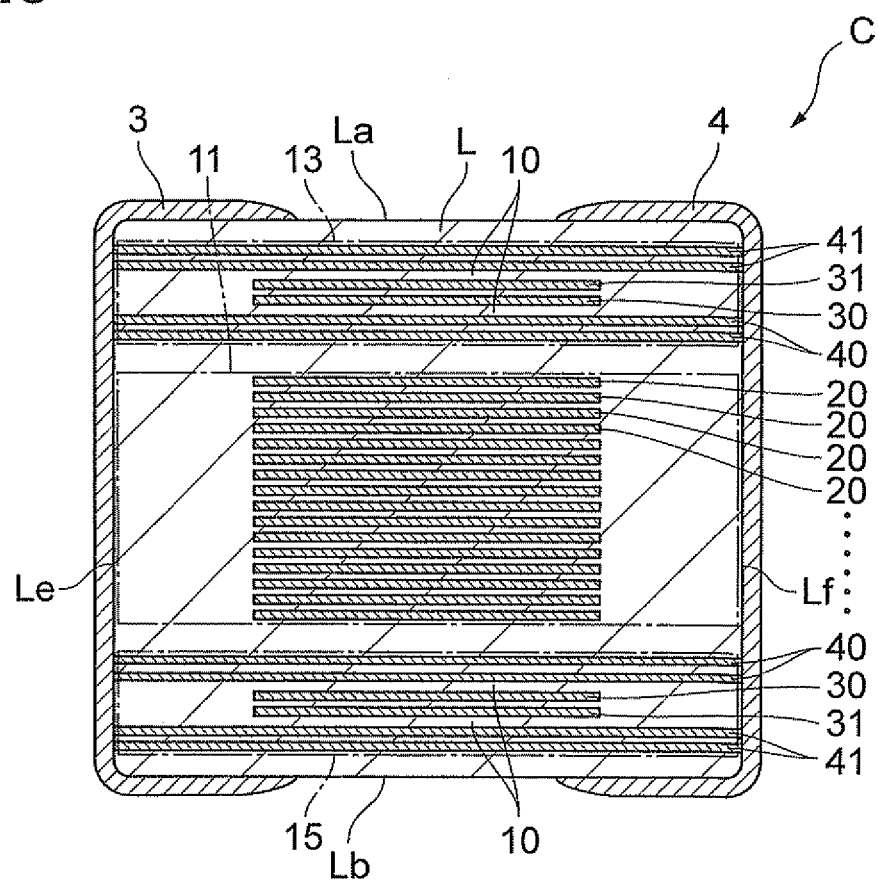
FIG. 3 is a drawing for explaining a cross-sectional structure taken along the line III-III in FIG. 1.
Figure 4:
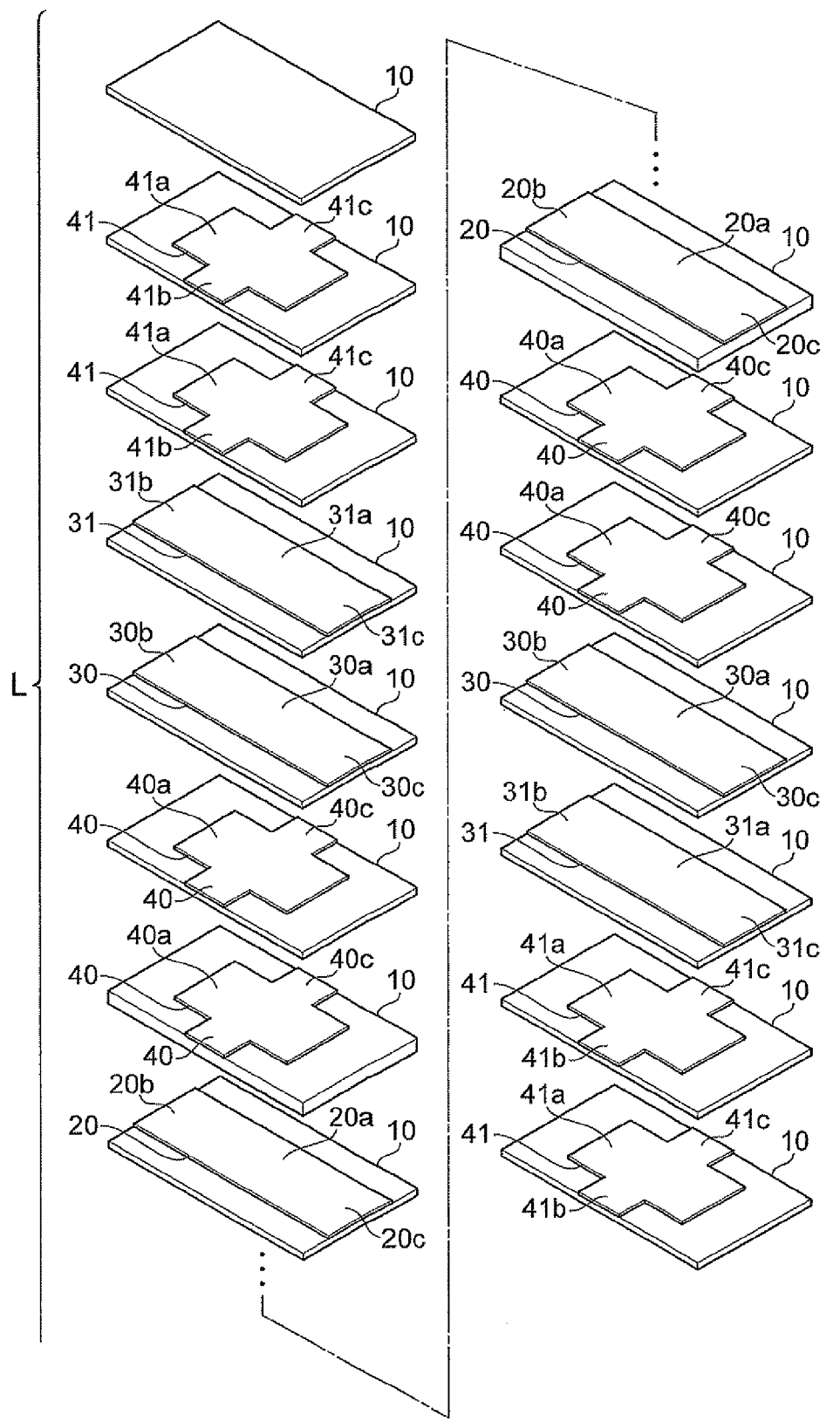
FIG. 4 is an exploded perspective view of a capacitor body.

First, with reference to FIGS. 1 to 4, the feedthrough multilayer capacitor C in accordance with an embodiment will be explained. FIG. 1 is a perspective view showing the feedthrough multilayer capacitor in accordance with an embodiment. FIG. 2 is a drawing for explaining a cross-sectional structure taken along the line II-II in FIG. 1. FIG. 3 is a drawing for explaining a cross-sectional structure taken along the line III-III in FIG. 1. FIG. 4 is an exploded perspective view of a capacitor body.

As shown in FIG. 1, the feedthrough multilayer capacitor C in accordance with this embodiment comprises a capacitor body L having a dielectric characteristic, first and second signal terminal electrodes 1, 2 disposed on the outer surface of the capacitor body L, and first and second grounding terminal electrodes 3, 4 disposed on the outer surface of the capacitor body L.

As shown in FIG. 1, the capacitor body L is shaped like a nearly rectangular parallelepiped and has, as its outer surface, first and second principal faces La, Lb of a nearly rectangular shape opposed to each other, first and second side faces Lc, Ld opposed to each other, and third and fourth side faces Le, Lf opposed to each other. The first and second side faces Lc, Ld extend in the short-side direction of the first and second principal faces La, Lb so as to connect the first and second principal faces La, Lb. The third and fourth side faces Le, Lf extend in the long-side direction of the first and second principal faces La, Lb so as to connect the first and second principal faces La, Lb.

The first signal terminal electrode 1 is disposed on the first side face Lc of the capacitor body L. The first signal terminal electrode 1 is formed over end portions (on the first side face Lc side) of the first and second principal faces La, Lb and third and fourth side faces Le, Lf so as to cover the first side face Lc as a whole. The second signal terminal electrode 2 is disposed on the second side face Ld of the capacitor body L. The second signal terminal electrode 2 is formed over end portions (on the second side face Ld side) of the first and second principal faces La, Lb and third and fourth side faces Le, Lf so as to cover the second side face Ld as a whole. The first and second signal terminal electrodes 1, 2 oppose each other in the opposing direction of the first and second side faces Lc, Ld.

The first grounding terminal electrode 3 is disposed on the third side face Le of the capacitor body L. The first grounding terminal electrode 3 covers substantially the center portion of the third side face Le in the opposing direction of the first and second side faces Lc, Ld transversely along the opposing direction of the first and second side faces La, Lb. The first grounding terminal electrode 3 further partly covers end portions on the third side face Le side of the first and second principal faces La, Lb.

The second grounding terminal electrode 4 is disposed on the fourth side face Lf of the capacitor body L. The second grounding terminal electrode 4 covers substantially the center portion of the fourth side face Lf in the opposing direction of the first and second side faces Lc, Ld transversely along the opposing direction of the first and second side faces La, Lb. The second grounding terminal electrode 4 further partly covers end portions on the fourth side face Lf side of the first and second principal faces La, Lb. The first and second grounding terminal electrodes 3, 4 oppose each other in the opposing direction of the third and fourth side faces Le, Lf.

The first and second signal terminal electrodes 1, 2 and first and second grounding terminal electrodes 3, 4 are formed, for example, by applying and sintering a conductive paste containing a conductive metal powder and a glass frit onto the outer surface of the capacitor body. A plating layer may be formed on the sintered terminal electrodes when necessary. The signal terminal electrodes 1, 2 and grounding terminal electrodes 3, 4 are formed such as to be electrically insulated from each other on the surfaces of the capacitor body L.

Preferably, the feedthrough multilayer capacitor C is mounted to an electronic device (e.g., a circuit board, an electronic component, or the like) while using the first principal face La or second principal face Lb as a mount surface for the electronic device. For example, the circuit board comprises a land electrode formed on a substrate and connected to a signal line and a grounding electrode formed on the substrate and connected to a grounding line. When the feedthrough multilayer capacitor C is mounted such that the second principal face Lb of the capacitor body L opposes the circuit board, the first and second signal terminal electrodes 1, 2 are connected to the land electrode, while the first and second grounding terminal electrodes 3, 4 are connected to the grounding electrode.

As shown in FIGS. 2 to 4, the capacitor body L is constructed by laminating a plurality of insulator layers 10 in the opposing direction of the first and second principal faces La, Lb. Each insulator layer 10 is constituted by a sintered body of a ceramic green sheet containing a dielectric ceramic (based on $BaTiO_3$, $Ba(Ti, Zr)O_3$, $(Ba, Ca)TiO_3$, or the like), for example. In the capacitor body L, the insulator layers 10 are integrally formed so that no boundary can be visually recognized between them.

The capacitor body L has a conducting portion 11 and a pair of capacitance portions 13, 15. The pair of capacitance portions 13, 15 hold therebetween the conducting portion 11 in the opposing direction of the first and second principal faces La, Lb, i.e., in the laminating direction of the insulator layers 10. The capacitance portion 13 is located between the conducting portion 11 and the first principal face La, while the capacitance portion 15 is located between the conducting portion 11 and the second principal face Lb. The capacitance portions 13, 15 mainly contribute to forming the capacitance of the feedthrough multilayer capacitor C.

The conducting portion 11 includes a plurality of (16 in this embodiment) conducting inner electrodes 20. The conducting portion 11 is formed by arranging these conducting inner electrodes 20 through the insulator layers 10. The conducting inner electrodes 20 adjacently oppose each other in the laminating direction of the insulator layers 10.

Figure 5:
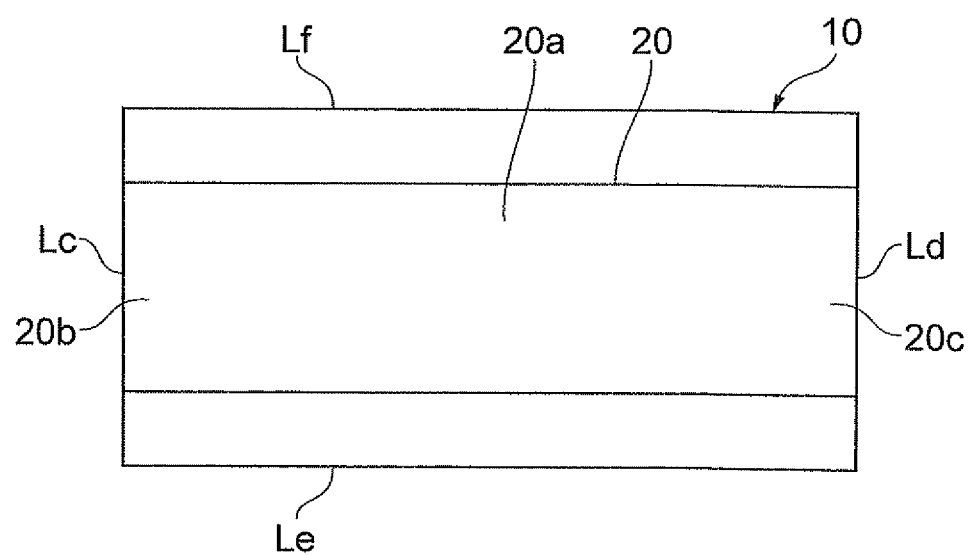
FIG. 5 is a plan view showing a conducting inner electrode.

As also shown in FIG. 5, each conducting inner electrode 20 has a main electrode portion 20a and lead electrode portions 20b, 20c. The lead electrode portion 20b extends from the main electrode portion 20a so as to be drawn to the first side face Lc. The lead electrode portion 20c extends from the main electrode portion 20a so as to be drawn to the second side face Ld. The main electrode portion 20a is formed integrally with the lead electrode portions 20b, 20c.

The main electrode portion 20a is shaped like a rectangle having a long-side direction coinciding with the opposing direction of the first and second side faces Lc, Ld and a short-side direction coinciding with the opposing direction of the third and fourth side faces Le, Lf. The lead electrode portion 20b extends from the end portion on the first side face Lc side of the main electrode portion 20a to the first side face Lc by the same width as with the main electrode portion 20a. The lead electrode portion 20b has an end portion exposed at the first side face Lc and is connected to the first signal terminal electrode 1 at the exposed end portion. The lead electrode portion 20c extends from the end portion on the second side face Ld side of the main electrode portion 20a to the second side face Ld by the same width as with the main electrode portion 20a. The lead electrode portion 20c has an end portion exposed at the second side face Ld and is connected to the second signal terminal electrode 2 at the exposed end portion.

The first signal terminal electrode 1 is formed such as to cover the whole portion exposed at the first side face Lc in the lead electrode portion 20b, whereby the lead electrode portion 20b is connected to the first signal terminal electrode 1 physically and electrically. As a consequence, each conducting inner electrode 20 is connected to the first signal terminal electrode 1. The second signal terminal electrode 2 is formed such as to cover the whole portion exposed at the second side face Ld in the lead electrode portion 20c, whereby the lead electrode portion 20c is connected to the second signal terminal electrode 2 physically and electrically. As a consequence, each conducting inner electrode 20 is connected to the second signal terminal electrode 2.

Each of the capacitance portions 13, 15 includes a plurality of signal inner electrodes (first and second signal inner electrodes 30, 31), a plurality of first grounding inner electrodes (two layers of first grounding inner electrodes in this embodiment) 40, and a plurality of second grounding inner electrodes (two layers of second grounding inner electrodes in this embodiment) 41. Each of the capacitance portions 13, 15 is constructed by arranging the inner electrodes 30, 31, 40, 41 through the insulator layers 10. The first and second signal inner electrodes 30, 31 adjacently oppose each other in the laminating direction of the insulator layers 10. The first grounding inner electrodes 40 adjacently oppose each other in the laminating direction of the insulator layers 10. The second grounding inner electrodes 41 adjacently oppose each other in the laminating direction of the insulator layers 10.

Each set of the two layers of first grounding inner electrodes 40 is located between the conducting portion 11 and the signal inner electrode (first signal inner electrode 30). One of the first grounding inner electrodes 40 adjacently opposes the first signal inner electrode 30 in the laminating direction. The other first grounding inner electrode 40 adjacently opposes the conducting inner electrode 20 in the laminating direction.

Each set of the two layers of second grounding inner electrodes 41 is located between its corresponding principal face La, Lb and signal inner electrode (second signal inner electrode 31). One of the second grounding inner electrodes 41 adjacently opposes the second signal inner electrode 31 in the laminating direction.

As also shown in FIG. 6, the signal inner electrodes 30, 31 have their corresponding main electrode portions 30a, 31a and lead electrode portions 30b, 31b, 30c, 31c. The lead electrode portions 30b, 31b extend from their corresponding main electrode portions 30a, 31a so as to be drawn to the first side face Lc. The lead electrode portions 30c, 31c extend from their corresponding main electrode portions 30a, 31a so as to be drawn to the second side face Ld. The main electrode portions 30a, 31a are integrally formed with their corresponding lead electrode portions 30b, 31b, 30c, 31c.

Each of the main electrode portions 30a, 31a is shaped like a rectangle having a long-side direction coinciding with the opposing direction of the first and second side faces Lc, Ld and a short-side direction coinciding with the opposing direction of the third and fourth side faces Le, Lf. The lead electrode portions 30b, 31b extend from the end portions on the first side face Lc side of their corresponding main electrode portions 30a, 31a to the first side face Lc by the same width as with the main electrode portions 30a, 31a. The lead electrode portions 30b, 31b have respective end portions exposed at the first side face Lc and are connected to the first signal terminal electrode 1 at the exposed end portions. The lead electrode portions 30c, 31c extend from the end portions on the second side face Ld side of their corresponding main electrode portions 30a, 31a to the second side face Ld by the same width as with the main electrode portions 30a, 31a. The lead electrode portions 30c, 31c have respective end portions exposed at the second side face Ld and are connected to the second signal terminal electrode 2 at the exposed end portions.

The first signal terminal electrode 1 is formed such as to cover all the portions exposed at the first side face Lc in the lead electrode portions 30b, 31b as well, whereby the lead electrode portions 30b, 31b are connected to the first signal terminal electrode 1 physically and electrically. As a consequence, the first and second signal inner electrodes 30, 31 are connected to the first signal terminal electrode 1. The second signal terminal electrode 2 is formed such as to cover all the portions exposed at the second side face Ld in the lead electrode portions 30c, 31d as well, whereby the lead electrode portions 30c, 31c are connected to the second signal terminal electrode 2 physically and electrically. As a consequence, the first and second signal inner electrodes 30, 31 are connected to the second signal terminal electrode 2.

As also shown in FIG. 7, the grounding inner electrodes 40, 41 have their corresponding main electrode portions 40a, 41a and lead electrode portions 40b, 41b, 40c, 41c. The lead electrode portions 40b, 41b extend from their corresponding main electrode portions 40a, 41a so as to be drawn to the third side face Le. The lead electrode portions 40c, 41c extend from their corresponding main electrode portions 40a, 41a so as to be drawn to the fourth side face Lf. The main electrode portions 40a, 41a are integrally formed with their corresponding lead electrode portions 40b, 41b, 40c, 41c.

Each of the main electrode portions 40a, 41a is shaped like a rectangle having a long-side direction coinciding with the opposing direction of the first and second side faces Lc, Ld and a short-side direction coinciding with the opposing direction of the third and fourth side faces Le, Lf. The lead electrode portions 40b, 41b extend from substantially the center portions of long-sides that are respective end portions on the third side face Le side of their corresponding main electrode portions 40a, 41a to the third side face Le. The lead electrode portions 40b, 41b have respective end portions exposed at the third side face Le and are connected to the first grounding terminal electrode 3 at the exposed end portions. The lead electrode portions 40c, 41c extend from substantially the center portions of long-sides that are respective end portions on the fourth side face Lf side of their corresponding main electrode portions 40a, 41a to the fourth side face Lf. The lead electrode portions 40c, 41c have respective, end portions exposed at the fourth side face Lf and are connected to the second grounding terminal electrode 4 at the exposed end portions.

The first grounding terminal electrode 3 is formed such as to cover all the portions exposed at the third side face Le in the lead electrode portions 40b, 41b, whereby the lead electrode portions 40b, 41b are connected to the first grounding terminal electrode 3 physically and electrically. As a consequence, the grounding inner electrodes 40, 41 are connected to the first grounding terminal electrode 3. The second grounding terminal electrode 4 is formed such as to cover all the portions exposed at the fourth side face Lf in the lead electrode portions 40c, 41c, whereby the lead electrode portions 40c, 41c are connected to the second grounding terminal electrode 4 physically and electrically. As a consequence, the grounding inner electrodes 40, 41 are connected to the second grounding terminal electrode 4.

As mentioned above, the feedthrough multilayer capacitor C comprises, as inner electrodes, a plurality of conducting inner electrodes 20, a plurality of signal inner electrodes (first and second signal inner electrodes 30, 31), a plurality of first grounding inner electrodes 40, and a plurality of second grounding inner electrodes 41. The capacitor body L is constructed by laminating a plurality of insulator layers 10 and a plurality of inner electrodes 20, 30, 31, 40, 41. Each of the inner electrodes (conducting inner electrodes 20, first signal inner electrodes 30, second signal inner electrodes 31, first grounding inner electrodes 40, and second grounding inner electrodes 41) is constituted by a conductive material (e.g., Ni, Cu, or the like) typically used as inner electrodes for multilayer electric devices. Each of the inner electrodes 20, 30, 31, 40, 41 is constructed as a sintered body of a conductive paste containing the conductive material.

The inner electrodes 20, 30, 31, 40, 41 are arranged in parallel so as to align in the opposing direction of the first and second principal faces La, Lb, i.e., in the laminating direction of the insulator layers 10. In this embodiment, 2 layers of second grounding inner electrodes 41, a second signal inner electrode 31, a first signal inner electrode 30, 2 layers of first grounding inner electrodes 40, 16 layers of conducting inner electrodes 20, 2 layers of first grounding inner electrodes 40, a first signal inner electrode 30, a second signal inner electrode 31, and 2 layers of second grounding inner electrodes 41 are arranged in this order from the first principal face La side in the opposing direction of the first and second principal faces La, Lb. The total number (total number of laminated layers) of conducting inner electrodes 20 is 16, while the total number (total number of laminated layers) of first signal inner electrodes 30, second signal inner electrodes 31, first grounding inner electrodes 40, and second grounding inner electrodes 41 is 12. The total number of conducting inner electrodes 20 is greater than the total number of first signal inner electrodes 30, second signal inner electrodes 31, first grounding inner electrodes 40, and second grounding inner electrodes 41.

Figure 8:
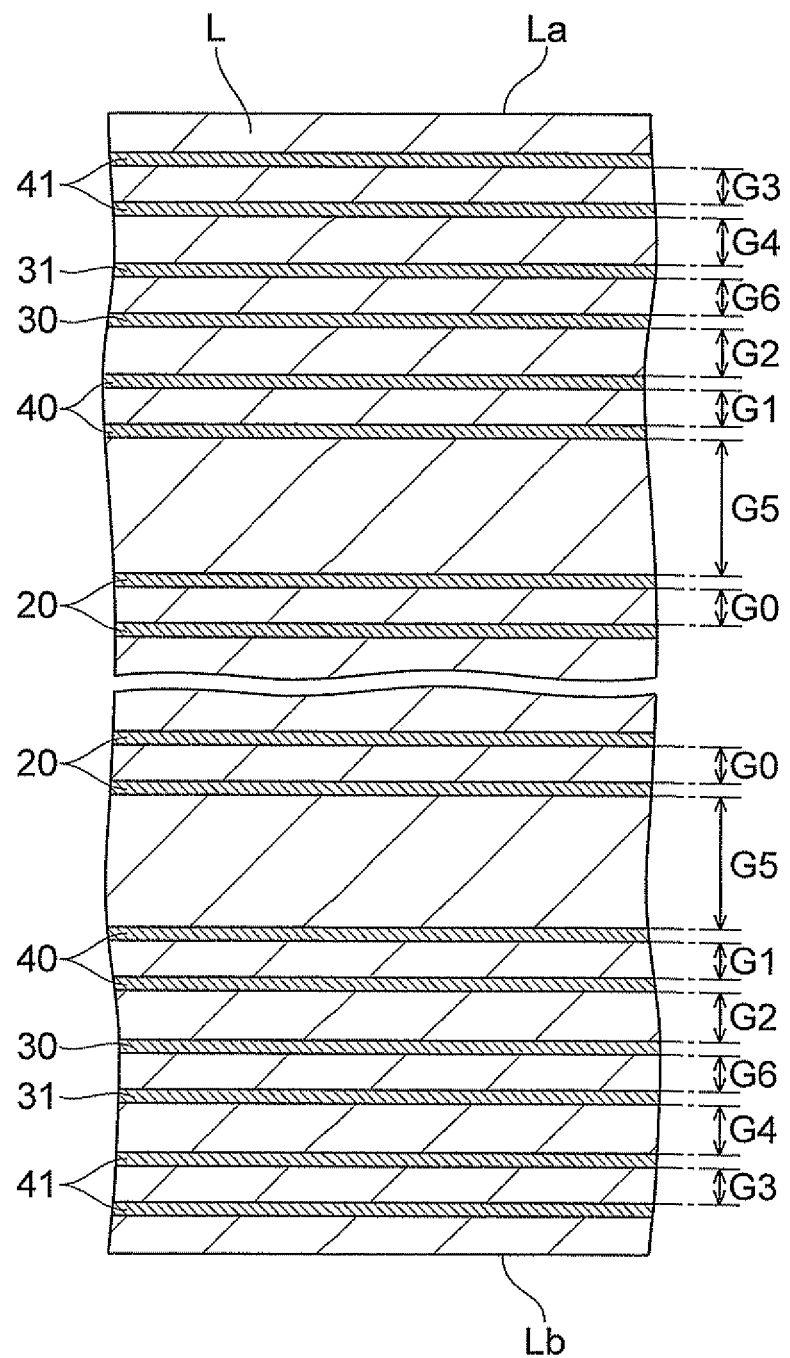
FIG. 8 is a drawing for explaining gaps between inner electrodes.

In each of the capacitance portions 13, 15, as shown in FIG. 8, the gap G1 between the first grounding inner electrodes 40 is narrower than the gap G2 between the first grounding inner electrode 40 and first signal inner electrode 30 adjacently opposing each other in the laminating direction of the insulator layers 10. The gap G3 between the second grounding inner electrodes 41 is narrower than the gap G4 between the second grounding inner electrode 41 and second signal inner electrode 31 adjacently opposing each other in the laminating direction of the insulator layers 10.

The gap G5 between the conducting inner electrode 20 and first grounding inner electrode 40 adjacently opposing each other in the laminating direction of the insulator layers 10 is wider than each of the gaps G1, G2, G3, G4, G6 between the inner electrodes 30, 31, 40, 41 in each of the capacitance portions 13, 15. That is, the gap G5 between the inner electrode (first grounding inner electrode 40) located closest to the conducting portion 11 in each of the capacitance portions 13, 15 and the conducting inner electrode 20 located closest to the capacitance portion 13, 15 is wider than each of the gaps G1, G2, G3, G4, G6 between the inner electrodes 30, 31, 40, 41 in each of the capacitance portions 13, 15. In this embodiment, each of the gaps G1, G3, G6 is substantially the same as the gap G0 between the conducting inner electrodes 20.

In this embodiment, as in the foregoing, the conducting portion 11 located between the pair of capacitance portions 13, 15 includes a plurality of conducting inner electrodes 20 connected to the first and second signal terminal electrodes 1, 2. As a consequence, the feedthrough multilayer capacitor C has sufficiently low DC resistance and can fully enhance the tolerable level of DC electricity.

In this embodiment, the total number of conducting inner electrodes 20 (total number of inner electrodes included in the conducting portion 11) is greater than the total number of the first signal inner electrodes 30, second signal inner electrodes 31, first grounding inner electrodes 40, and second grounding inner electrodes 41 (total number of inner electrodes included in the capacitance portions 13, 15). As a consequence, the feedthrough multilayer capacitor C has sufficiently low DC resistance and can fully enhance the tolerable level of DC electricity.

In the conducting portion 11, the first and second signal terminal electrodes 1, 2 are electrically connected to each other through the conducting inner electrodes 20. Therefore, high-frequency noise components arriving at the conducting portion 11, if any, are transmitted without being removed. When the feedthrough multilayer capacitor C is mounted to an electronic device while using the first principal face La or second principal face Lb as a mount surface, one of the capacitance portions 13, 15 is located closer to the electronic device than is the conducting portion 11 in this embodiment. As a consequence, the high-frequency noise components fed to the feedthrough multilayer capacitor C from the electronic device side are removed by the capacitance portion 13, 15 located on the mount surface side before reaching the conducting portion 11.

When the signal inner electrodes have three or more layers, there is a signal inner electrode which is not adjacent to any of the first and second grounding inner electrodes 40, 41. This may cause high-frequency noise components to flow into the signal inner electrode not adjacent to any of the first and second grounding inner electrodes 40, 41, thereby worsening the effect of removing noises. In this embodiment, by contrast, each of the capacitance portions 13, 15 has only the first and signal inner electrodes 30, 31 as the signal inner electrodes, whereby there is no risk of worsening the noise removal effect. That is, there is no signal inner electrode which is not adjacent to any of the first and second grounding inner electrodes 40, 41.

In this embodiment, the gap G5 between the conducting inner electrode 20 and first grounding inner electrode 40 adjacently opposing each other in the laminating direction of the insulator layers 10 is wider than each of the gaps G1, G2, G3, G4, G6 between the inner electrodes 30, 31, 40, 41 in each of the capacitance portions 13, 15. This enhances the impedance between each of the capacitance portions 13, 15 and the conducting portion 11, so that high-frequency noise components are hard to reach the conducting portion 11. Therefore, the noise removal effect can be improved.

The feedthrough multilayer capacitor C comprises a plurality of first grounding inner electrodes 40. This lowers equivalent series resistance (ESR) and thus can reduce losses in high-frequency signals. The feedthrough multilayer capacitor C comprises a plurality of second grounding inner electrodes 41 in addition to the first grounding inner electrodes 40, thus yielding a number of junctions between the grounding inner electrodes 40, 41 and their corresponding grounding terminal electrodes 3, 4. This can improve the adhesion between the capacitor body L and the grounding terminal electrodes 3, 4.

When a large DC electricity flows through the feedthrough multilayer capacitor C, the conducting inner electrodes 20 and the first and second signal inner electrodes 30, 31 are heated. Since there are a plurality of second grounding inner electrodes 41 located near the first and second principal faces La, Lb, the feedthrough multilayer capacitor C can efficiently dissipate the heat generated therewithin.

In this embodiment, the gap G1 between the first grounding inner electrodes 40 is narrower than the gap G2 between the first grounding inner electrode 40 and first signal inner electrode 30 adjacently opposing each other in the laminating direction. The gap G3 between the second grounding inner electrodes 41 is narrower than the gap G4 between the second grounding inner electrode 41 and second signal inner electrode 31 adjacently opposing each other in the laminating direction. These make the gaps G1, G3 between the grounding inner electrodes 40, 41 relatively narrow, whereby the internally generated heat can be dissipated further efficiently.

In this embodiment, the pair of capacitance portions 13, 15 are placed such as to hold the conducting portion 11 therebetween in the capacitor body L. Therefore, when mounting the feedthrough multilayer capacitor C to an electronic device, the directivity of the feedthrough multilayer capacitor C can be canceled, so as to improve the workability at the time of mounting.

Figure 9:
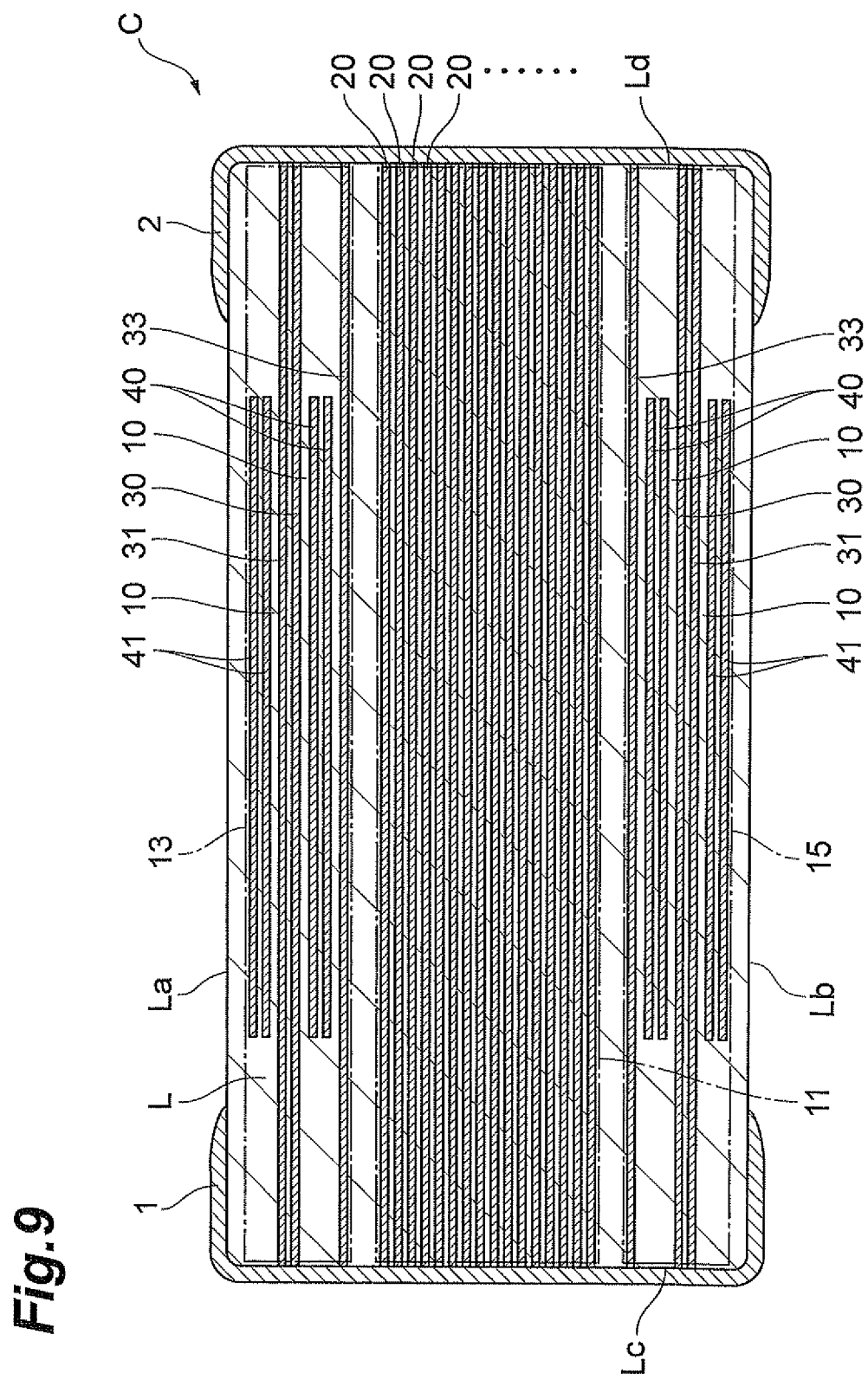
FIG. 9 is a drawing for explaining a cross-sectional structure of the feedthrough multilayer capacitor in accordance with a modification example of the embodiment.
Figure 10:
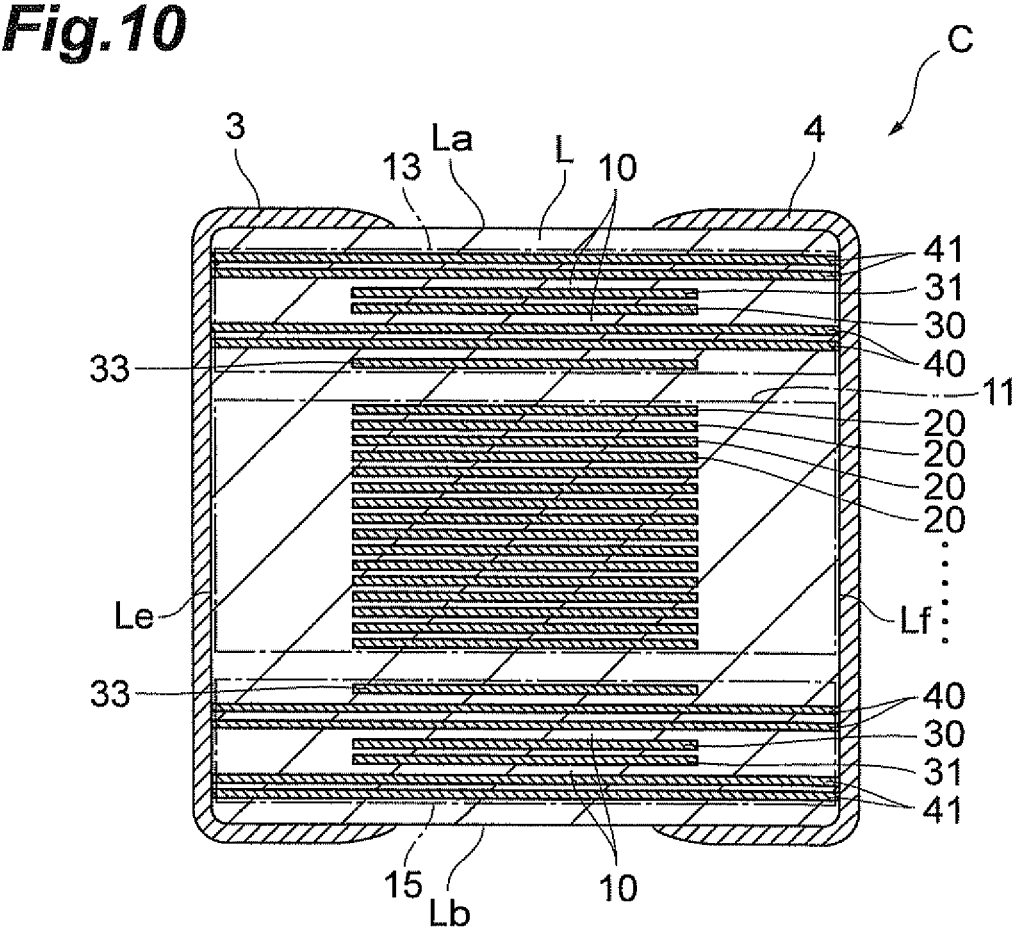
FIG. 10 is a drawing for explaining a cross-sectional structure of the feedthrough multilayer capacitor in accordance with the modification example of the embodiment.

A modification example of the feedthrough multilayer capacitor C will now be explained with reference to FIGS. 9 and 10. FIGS. 9 and 10 are drawings for explaining cross-sectional structures of the feedthrough multilayer capacitor in accordance with the modification example of the embodiment.

In the feedthrough multilayer capacitor C in accordance with the modification example, each of the capacitance portions 13, 15 includes a third signal inner electrode 33. The third signal inner electrode 33 is located between the conducting portion 11 and a plurality of first grounding inner electrodes 40. The third signal inner electrode 33 adjacently opposes not only the conducting inner electrode 20 but also the above-mentioned other first grounding inner electrode 40 in the laminating direction of the insulator layers 10.

Figure 11:
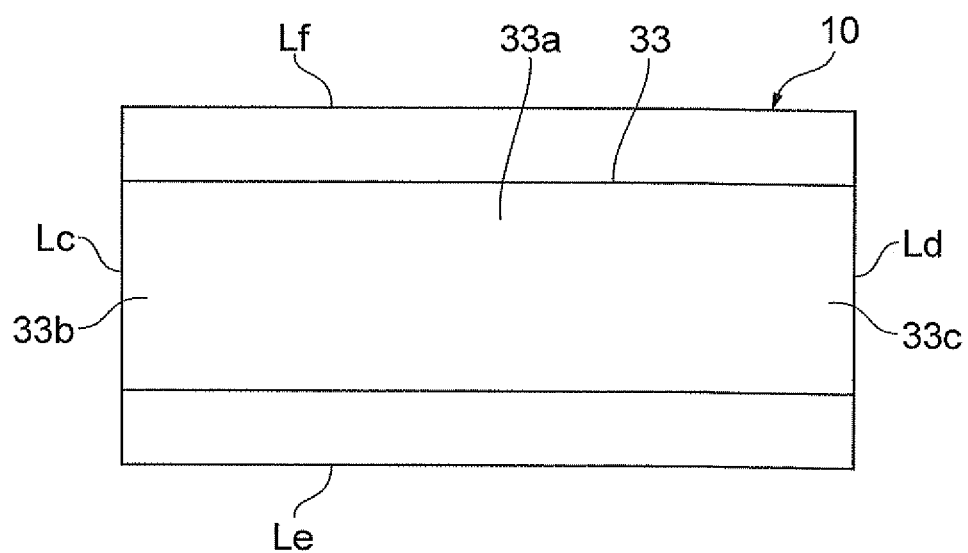
FIG. 11 is a plan view showing a third signal inner electrode.

As also shown in FIG. 11, the third signal inner electrode 33 has a main electrode portion 33a and lead electrode portions 33b, 33c. The lead electrode portion 33b extends from the main electrode portion 33a so as to be drawn to the first side face Lc. The lead electrode portion 33c extends from the main electrode portion 33a so as to be drawn to the second side face Ld. The main electrode portion 33a is formed integrally with the lead electrode portions 33b, 33c.

The main electrode portion 33a is shaped like a rectangle having a long-side direction coinciding with the opposing direction of the first and second side faces Lc, Ld and a short-side direction coinciding with the opposing direction of the third and fourth side faces Le, Lf. The lead electrode portion 33b extends from the end portion on the first side face Lc side of the main electrode portion 33a to the first side face Lc by the same width as with the main electrode portion 33a. The lead electrode portion 33b has an end portion exposed at the first side face Lc and is connected to the first signal terminal electrode 1 at the exposed end portion. The lead electrode portion 33c extends from the end portion on the second side face Ld side of the main electrode portion 33a to the second side face Ld by the same width as with the main electrode portion 33a. The lead electrode portion 33c has an end portion exposed at the second side face Ld and is connected to the second signal terminal electrode 2 at the exposed end portion.

The first signal terminal electrode 1 is formed such as to cover the whole portion exposed at the first side face Lc in the lead electrode portion 33b as well, whereby the lead electrode portion 33b is connected to the first signal terminal electrode 1 physically and electrically. As a consequence, the third signal inner electrode 33 is connected to the first signal terminal electrode 1. The second signal terminal electrode 2 is formed such as to cover the whole portion exposed at the second side face Ld in the lead electrode portion 33c as well, whereby the lead electrode portion 33c is connected to the second signal terminal electrode 2 physically and electrically. As a consequence, the third signal inner electrode 33 is connected to the second signal terminal electrode 2.

Figure 12:
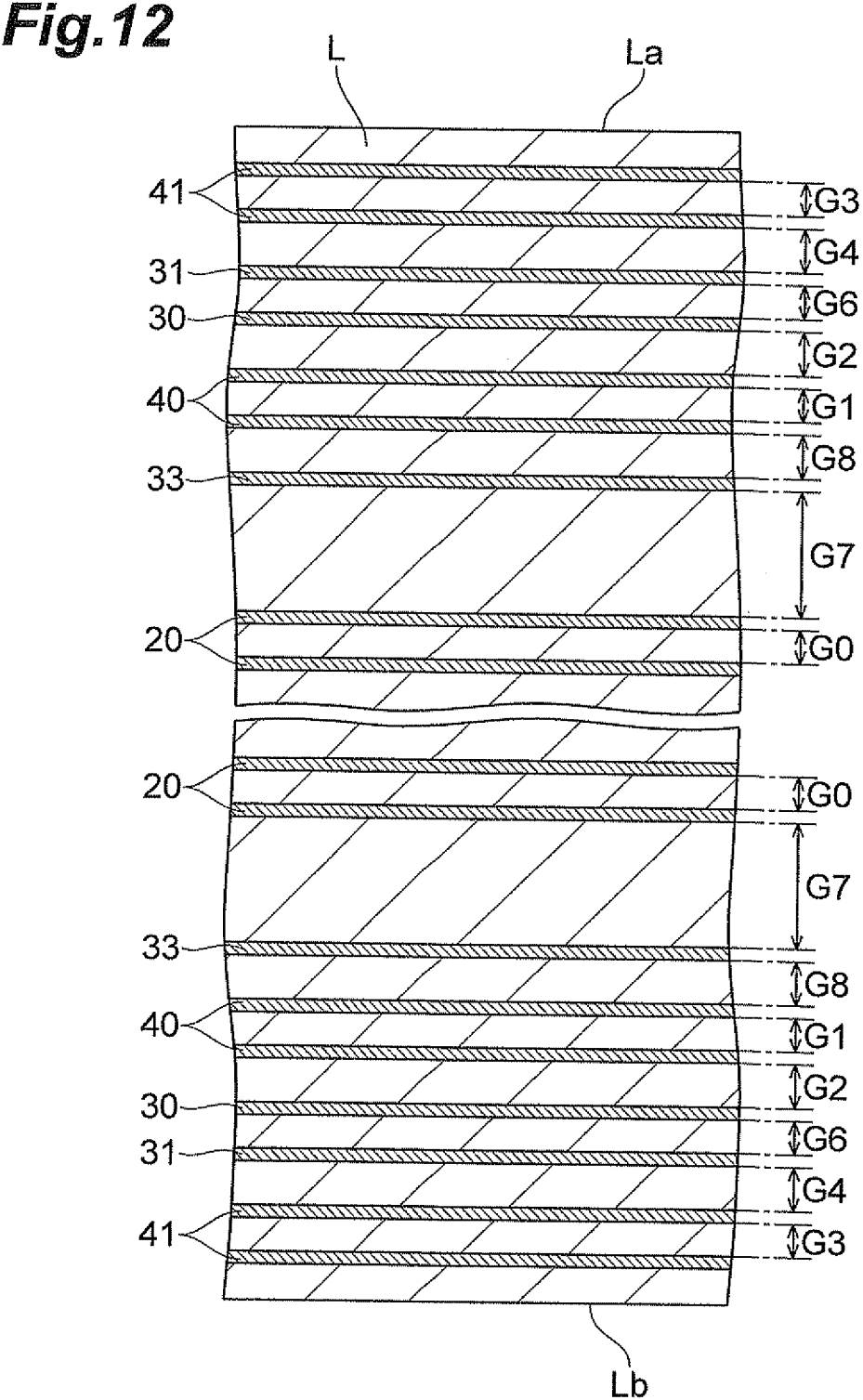
FIG. 12 is a drawing for explaining gaps between inner electrodes.

As shown in FIG. 12, the gap G7 between the conducting inner electrode 20 and third signal inner electrode 33 adjacently opposing each other in the laminating direction of the insulator layers 10 is wider than each of the gaps G1, G2, G3, G4, G6, G8 between the inner electrodes 30, 31, 33, 40, 41 in each of the capacitance portions 13, 15. That is, the gap G7 between the inner electrode (third grounding inner electrode 33) located closest to the conducting portion 11 in each of the capacitance portions 13, 15 and the conducting inner electrode 20 located closest to the capacitance portion 13, 15 is wider than each of the gaps G1, G2, G3, G4, G6, G8 between the inner electrodes 30, 31, 33, 40, 41 in each of the capacitance portions 13, 15.

The feedthrough multilayer capacitor C in accordance with this modification example also has sufficiently low DC resistance and can fully enhance the tolerable level of DC electricity as mentioned above.

In this modification example, the gap G7 between the conducting inner electrode 20 and third grounding inner electrode 33 adjacently opposing each other in the laminating direction of the insulator layers 10 is wider than each of the gaps G1, G2, G3, G4, G6, G8 between the inner electrodes 30, 31, 33, 40, 41 in each of the capacitance portions 13, 15. This enhances the impedance between each of the capacitance portions 13, 15 and the conducting portion 11, so that high-frequency noise components are hard to reach the conducting portion 11. High-frequency noise components fed from the electronic device side to the feedthrough multilayer capacitor C, if any, also flow into the third signal inner electrode 33 before reaching the conducting portion 11, thereby being further inhibited from flowing into the conducting inner electrodes 20 (conducting portion 11). These can further improve the noise removal effect.

A modification example of the feedthrough multilayer capacitor will now be explained with reference to FIGS. 13 to 16. FIGS. 13 and 14 are sets of plan views showing a modification example of the first and second signal inner electrodes. FIG. 15 is a set of plan views showing a modification example of the first grounding inner electrodes. FIG. 16 is a set of plan views showing a modification example of the second grounding inner electrodes. The feedthrough multilayer capacitor in accordance with this modification example differs from the feedthrough multilayer capacitor C in accordance with the above-mentioned embodiment in the forms of the first and second signal inner electrodes 30, 31 and first and second grounding inner electrodes 40, 41.

As shown in FIG. 13, the first and second signal inner electrodes 30, 31 located closer to the first principal face La than is the conducting portion 11 have respective areas different from each other. Here, the area of the first signal inner electrode 30 is larger than that of the second signal inner electrode 31. The outer contour of the portion of the first signal inner electrode 30 placed within the capacitor body L is located on the outside of the outer contour of the second signal inner electrode 31 placed within the capacitor body L as seen in the laminating direction of the insulating layers 10.

As shown in FIG. 14, the first and second signal inner electrodes 30, 31 located closer to the second principal face Lb than is the conducting portion 11 also have respective areas different from each other. Here, the area of the second signal inner electrode 31 is larger than that of the first signal inner electrode 30. The outer contour of the portion of the second signal inner electrode 31 placed within the capacitor body L is located on the outside of the outer contour of the first signal inner electrode 30 placed within the capacitor body L as seen in the laminating direction of the insulating layers 10.

As shown in FIG. 15, the first grounding inner electrodes 40 have respective areas different from each other. On the first principal face La side of the conducting portion 11, the first grounding inner electrode 40 adjacently opposing the first signal inner electrode 30 in the laminating direction has an area smaller than that of the first grounding inner electrode 40 adjacently opposing the conducting inner electrode 20 in the laminating direction. On the second principal face Lb side of the conducting portion 11, the first grounding inner electrode 40 adjacently opposing the first signal inner electrode 30 in the laminating direction has an area larger than that of the first grounding inner electrode 40 adjacently opposing the conducting inner electrode 20 in the laminating direction. The outer contour of the portion of the first grounding inner electrode 40 having the larger area placed within the capacitor body L is located on the outside of the outer contour of the first grounding inner electrode 40 having the smaller area placed within the capacitor body L as seen in the laminating direction.

As shown in FIG. 16, the second grounding inner electrodes 41 have respective areas different from each other. On the first principal face La side of the conducting portion 11, the second grounding inner electrode 41 adjacently opposing the second signal inner electrode 31 in the laminating direction has an area larger than that of the second grounding inner electrode 41 located closer to the first principal face La. On the second principal face Lb side of the conducting portion 11, the second grounding inner electrode 41 adjacently opposing the second signal inner electrode 31 in the laminating direction has an area larger than that of the second grounding inner electrode 41 located closer to the second principal face Lb. The outer contour of the portion of the second grounding inner electrode 41 having the larger area placed within the capacitor body L is located on the outside of the outer contour of the second grounding inner electrode 41 having the smaller area placed within the capacitor body L as seen in the laminating direction.

As for the first and second signal inner electrodes 30, 31 located on the first principal face La side of the conducting portion 11, the area of the second signal inner electrode 31 may be larger than that of the first signal inner electrode 30; while, as for the first and second signal inner electrodes 30, 31 located on the second principal face Lb side of the conducting portion 11, the area of the first signal inner electrode 30 may be larger than that of the second signal inner electrode 31. In this case, on the first principal face La side of the conducting portion 11, the first grounding inner electrode 40 adjacently opposing the first signal inner electrode 30 in the laminating direction has an area larger than that of the first grounding inner electrode 40 adjacently opposing the conducting inner electrode 20 in the laminating direction; while, on the second principal face Lb side of the conducting portion 11, the first grounding inner electrode 40 adjacently opposing the first signal inner electrode 30 in the laminating direction has an area smaller than that of the first grounding inner electrode 40 adjacently opposing the conducting inner electrode 20 in the laminating direction. Similarly, on the first principal face La side of the conducting portion 11, the second grounding inner electrode 41 adjacently opposing the second signal inner electrode 31 in the laminating direction has an area smaller than that of the second grounding inner electrode 41 located closer to the first principal face La; while, on the second principal face Lb side of the conducting portion 11, the second grounding inner electrode 41 adjacently opposing the second signal inner electrode 31 in the laminating direction has an area larger than that of the second grounding inner electrode 41 located closer to the second principal face Lb.

This modification example suppresses respective fluctuations in areas by which the pairs of first and second signal inner electrodes 30, 31, first grounding inner electrodes 40, and second grounding inner electrodes 41 overlap each other in the laminating direction. Therefore, fluctuations in capacitance caused by those in inner electrode positions in the capacitance portions 13, 15 can be reduced.

Figure 17:
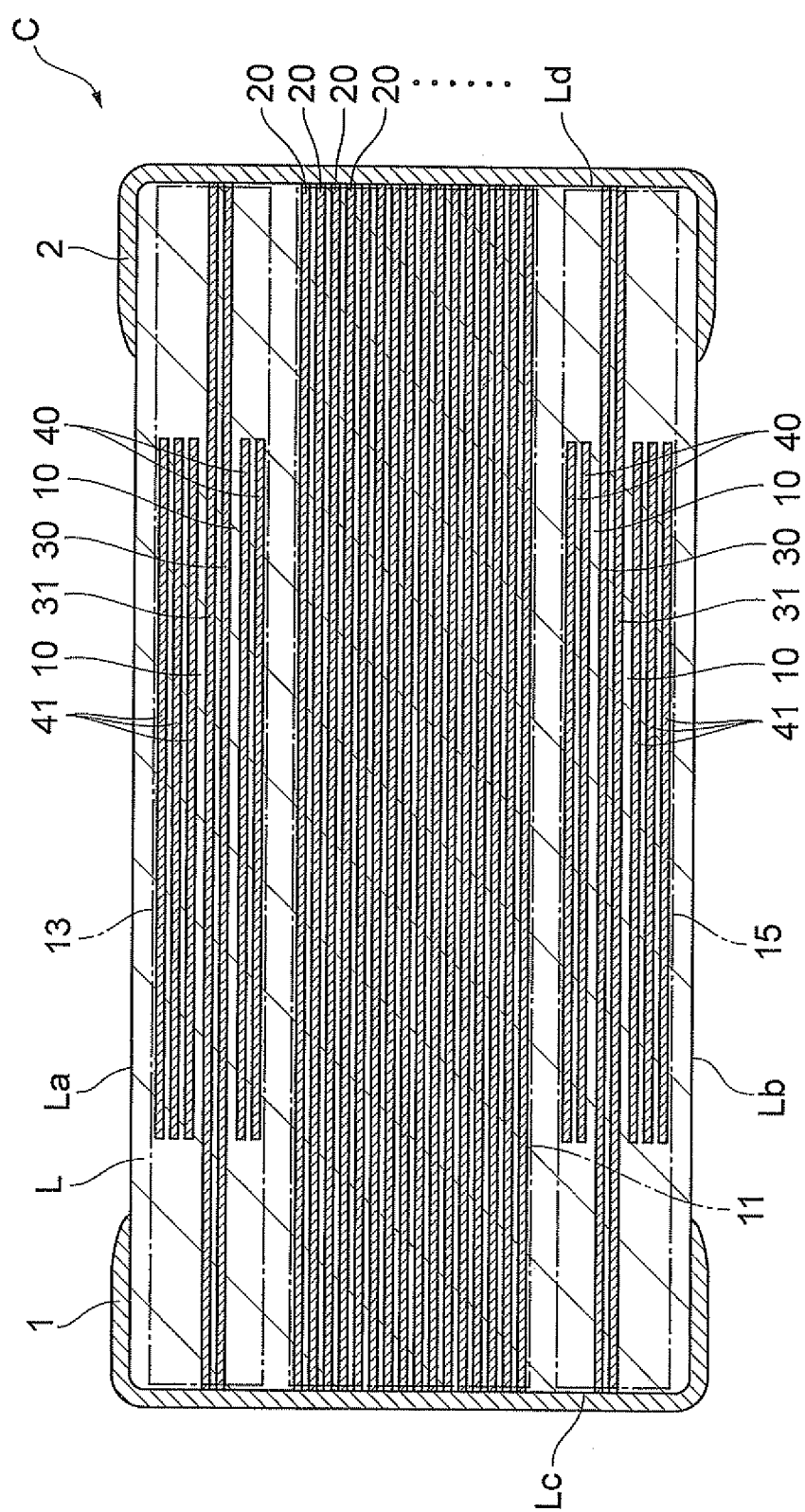
FIG. 17 is a drawing for explaining a cross-sectional structure of the feedthrough multilayer capacitor in accordance with a modification example of the embodiment.

With reference to FIG. 17, a modification example of the feedthrough multilayer capacitor C will now be explained. FIG. 17 is a drawing for explaining a cross-sectional structure of the feedthrough multilayer capacitor in accordance with a modification example of the embodiment.

As shown in FIG. 17, the number of laminated layers of second grounding inner electrodes 41 is set to 3 in the feedthrough multilayer capacitor C in accordance with this modification example.

This modification example increases dissipation paths provided by the second grounding inner electrodes 41 located near the principal faces La, Lb. As a consequence, the heat generated within the feedthrough multilayer capacitor C can be dissipated further efficiently. The number of laminated layers of second grounding inner electrodes 41 may be 4 or more. However, simply increasing the number of laminated layers of second grounding inner electrodes 41 causes the feedthrough multilayer capacitor C (capacitor body L) to have a larger chip size, which makes it necessary to set an upper limit for the number of laminated layers depending on restrictions such as chip size or the like.

Though a preferred embodiment of the present invention has been explained in the foregoing, the present invention is not necessarily limited to the embodiment mentioned above but can be modified in various ways within the scope not deviating from the gist thereof.

For example, the inner electrodes 20, 30, 31, 33, 40, 41 may have the same gap therebetween. The forms, numbers of laminated layers, and the like of the inner electrodes 20, 30, 31, 33, 40, 41 are not limited to the above-mentioned embodiment and modification examples. However, as mentioned above, it is preferred for the total number of conducting inner electrodes 20 to be greater than the total number of the other inner electrodes 30, 31, 33, 34.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A feedthrough multilayer capacitor comprising:
a capacitor body in which a plurality of insulator layers and a plurality of inner electrodes are laminated; and
first and second signal terminal electrodes and a grounding terminal electrode each disposed on an outer surface of the capacitor body;
wherein the capacitor body has a conducting portion and a pair of capacitance portions holding the conducting portion therebetween in a laminating direction in the capacitor body;
wherein the conducting portion includes a plurality of conducting inner electrodes connected to the first and second signal terminal electrodes as the inner electrodes;

wherein each of the pair of capacitance portions includes a plurality of signal inner electrodes connected to the first and second signal terminal electrodes while adjacently opposing each other in the laminating direction, a plurality of first grounding inner electrodes connected to the grounding terminal electrode while adjacently opposing each other in the laminating direction, and a plurality of second grounding inner electrodes connected to the grounding terminal electrode while adjacently opposing each other in the laminating direction as the inner electrodes;

wherein the plurality of first grounding inner electrodes are located between the conducting portion and the plurality of signal inner electrodes, one of the first grounding inner electrodes adjacently opposing one of the signal inner electrodes in the laminating direction; and wherein the plurality of second grounding inner electrodes are located between principal faces opposing each other in the laminating direction in the outer surface and the plurality of signal inner electrodes, one of the second grounding inner electrodes adjacently opposing one of the signal inner electrodes in the laminating direction.

2. The feedthrough multilayer capacitor according to claim 1, wherein the plurality of signal inner electrodes are constituted by only the first signal inner electrode adjacently opposing the one first grounding inner electrode in the laminating direction and the second signal inner electrode adjacently opposing the one second grounding inner electrode in the laminating direction.

3. The feedthrough multilayer capacitor according to claim 1, wherein the plurality of first grounding inner electrodes have a gap therebetween narrower than that between the one first grounding inner electrode and the one signal inner electrode adjacently opposing each other in the laminating direction.

4. The feedthrough multilayer capacitor according to claim 1, wherein the plurality of second grounding inner electrodes have a gap therebetween narrower than that between the one second grounding inner electrode and the one signal inner electrode adjacently opposing each other in the laminating direction.

5. The feedthrough multilayer capacitor according to claim 1, wherein the gap between the inner electrode in the capacitance portion located closest to the conducting portion and the conducting inner electrode located closest to the capacitance portion is wider than that between the inner electrodes in the capacitance portion.

6. The feedthrough multilayer capacitor according to claim 5, wherein one of the conducting inner electrodes and one of the first grounding inner electrodes adjacently oppose each other in the laminating direction; and wherein the gap between the one conducting inner electrode and the one first grounding inner electrode is wider than each of gaps between the signal inner electrodes, the first grounding inner electrodes, and the second grounding inner electrodes in the pair of capacitance portions.

7. The feedthrough multilayer capacitor according to claim 5, wherein each of the pair of capacitance portions further comprises signal inner electrodes located between the conducting portion and the plurality of first grounding inner electrodes while adjacently opposing one of the conducting inner electrodes in the laminating direction; and wherein the gap between the signal inner electrode adjacently opposing the one conducting inner electrode in the laminating direction and the one conducting inner electrode is wider than each of gaps between the signal inner electrodes, the first grounding inner electrodes, and the second grounding inner electrodes in the pair of capacitance portions.

8. The feedthrough multilayer capacitor according to claim 1, wherein the plurality of signal inner electrodes include two signal inner electrodes having respective areas different from each other;

wherein the plurality of first grounding inner electrodes include two first grounding inner electrodes having respective areas different from each other;

wherein the plurality of second grounding inner electrodes include two second grounding inner electrodes having respective areas different from each other;

wherein an outer contour of a portion of the signal inner electrode having the larger area placed within the capacitor body is located on the outside of an outer contour of a portion of the signal inner electrode having the smaller area placed within the capacitor body as seen in the laminating direction;

wherein an outer contour of a portion of the first grounding inner electrode having the larger area placed within the capacitor body is located on the outside of an outer contour of a portion of the first grounding inner electrode having the smaller area placed within the capacitor body as seen in the laminating direction;

wherein an outer contour of a portion of the second grounding inner electrode having the larger area placed within the capacitor body is located on the outside of an outer contour of a portion of the second grounding inner electrode having the smaller area placed within the capacitor body as seen in the laminating direction; and wherein the signal inner electrode having the larger area and the first or second grounding inner electrode having the smaller area adjacently oppose each other in the laminating direction, while the signal inner electrode having the smaller area and the first or second grounding inner electrode having the larger area adjacently oppose each other in the laminating direction.

9. The feedthrough multilayer capacitor according to claim 1, wherein the plurality of second grounding inner electrodes include three or more layers of the second grounding inner electrodes.

10. The feedthrough multilayer capacitor according to claim 1, wherein the number of the plurality of conducting inner electrodes is greater than the total number of the plurality of signal inner electrodes, plurality of first grounding inner electrodes, and plurality of second grounding inner electrodes.

* * * * *